United States Patent [19]

Bridge

[11] 4,307,386

[45] Dec. 22, 1981

[54] SECURITY SYSTEM AND STRIP OR STRAND INCORPORATING FIBRE-OPTIC WAVE GUIDE MEANS THEREFOR

[75] Inventor: Richard F. Bridge, Burlesdon, England

[73] Assignee: Roderick Iain Davidson, Farnham, England

[21] Appl. No.: 967,645

[22] Filed: Dec. 8, 1978

[30] Foreign Application Priority Data

Dec. 9, 1977 [GB] United Kingdom ............... 51444/77

May 31, 1978 [GB] United Kingdom ............... 40412/78

[51] Int. Cl.3 .......................... G02B 5/14; G08B 13/18

[52] U.S. Cl. .................................... 340/555; 156/176; 156/298; 156/303.1; 340/531; 350/96.23

[58] Field of Search ............... 340/555, 556, 564, 531; 350/96.23; 156/176, 177, 178, 158, 298, 303.1

[56] References Cited

U.S. PATENT DOCUMENTS

| | | | |
|---|---|---|---|
| 3,110,891 | 11/1963 | Herrick et al. | 340/564 |
| 3,454,261 | 7/1969 | Nachazel | 256/2 |
| 3,623,057 | 11/1971 | Hedin et al. | 340/557 |
| 3,688,298 | 8/1972 | Miller et al. | 340/557 |
| 3,714,644 | 1/1973 | Hellstrom | 340/508 |
| 3,825,916 | 7/1974 | Steel et al. | 340/557 |
| 3,898,639 | 8/1975 | Mucheryan | 340/529 |
| 3,938,124 | 2/1976 | Way et al. | 340/531 |
| 4,028,081 | 6/1977 | Marcatili | 350/96.23 X |
| 4,029,390 | 6/1977 | Chinnock et al. | 156/158 X |
| 4,090,902 | 5/1978 | Ferrentino et al. | 156/177 |
| 4,144,530 | 3/1979 | Redfern | 340/531 X |
| 4,147,407 | 4/1979 | Eichenbaum et al. | 350/96.23 X |
| 4,207,561 | 6/1980 | Steensma | 340/531 X |

FOREIGN PATENT DOCUMENTS

| | | | |
|---|---|---|---|
| 20928 | 3/1905 | Austria | 340/564 |
| 1497995 | 1/1978 | United Kingdom . | |

*Primary Examiner*—John W. Caldwell, Sr.

*Assistant Examiner*—Joseph E. Nowicki

*Attorney, Agent, or Firm*—Larson and Taylor

[57] ABSTRACT

In a security system in which at least one fibre-optic wave guide, which is carried in a strand, extends along a boundary, light is directed into one end of the guide and the light leaving the guide is detected by an optical detector. An indication is given when the intensity of the detected light falls below a predetermined threshold, so as to warn when the wave guide is disturbed significantly or cut through.

In order to manufacture the strand, a fibre-optic wave guide is positioned against an elongate carrier and secured to the latter by bonding agent and/or adhesive tape.

A dummy strip, having identical external appearance to the strand but not including a fibre-optic wave guide, can also run along the boundary in question.

5 Claims, 3 Drawing Figures

SECURITY SYSTEM AND STRIP OR STRAND INCORPORATING FIBRE-OPTIC WAVE GUIDE MEANS THEREFOR

This invention is concerned with an improved elongate body of strip or similar form intended to be used in a security system and incorporating fibre-optic wave guide means extending longitudinally of said body, and is also concerned with the manufacture of such an elongate body.

In U.S. patent application, Ser. No. 943,693, filed Sept. 19, 1978 there is disclosed a security system comprising fibre-optic wave guide means disposed to extend along a boundary, an energy source positioned to direct optical radiation along said guide means from one end, and a detector positioned to detect radiation leaving said guide means from its other end and arranged to change a state of said detector in response to any disturbances to said guide means other than negligible disturbances. The wave guide means can, for example, be installed in a wall or mounted in conduit disposed along the boundary in question. In a preferred security system, however, disclosed in the aforementioned U.S. patent application, there is used an elongate body of the kind specified above which is in the form of a strip and includes a single fibre-optic filament. The strip is incorporated in a fence running along a boundary. Light is directed into one end of the fibre-optic filament and changes in detected light intensity at the other end of the filament, caused by significant movement of the strip or the strip being cut, are used to detect any attempt, even unsuccessful, to cross the boundary. Such changes in detected light intensity are used to operate an audible or visual alarm.

The aforementioned U.S. patent application discloses a method of manufacturing the strip in which a fibre-optic filament is positioned against a core, having the form of a strip so as to extend longitudinally of the core, and then the core and the introduced filament are coated with material. In a typical example, the core is a steel strip and the coating material is zinc which is applied to the steel strip and fibre-optic filament by immersion in a molten zinc bath. For practical reasons, this method of manufacture is not always wholly satisfactory.

According to the present invention from one aspect there is provided a composite strip incorporating fibre-optic wave guide means extending longitudinally of the strip, the strip comprising a carrier formed with a longitudinal groove in which a fibre-optic filament, constituting the wave guide means, is held by adhesive means.

The carrier can be made of steel or of a galvanised strip painted with plastics-based paint, and the filament can be enclosed in a plastics sheathing.

The adhesive means may be a two-part flexible resin or a strip of adhesive tape applied to the carrier strip to cover at least the filament.

Barbs or serrations can be formed at intervals along each longitudinal edge of the strip.

According to the invention from a second aspect there is provided a security system in which a fence, wall or the like, disposed to extend along a given boundary, includes fibre-optic wave guide means in a strand running along the boundary, there being an energy source positioned to direct optical radiation along said guide means from one end, and a detector positioned to detect radiation leaving said guide means from the other end and arranged to change its state in response to a change in detected radiation outside a predetermined range, wherein a further strand runs longitudinally of the fence, wall or the like, this strand being of identical appearance externally to the first-mentioned strand but not including any fibre-optic wave guide means.

In one arrangement, the first-mentioned strand is a strip having any one of the optical features listed above.

In accordance with the invention from a third aspect, there is provided a method of making a composite strand incorporating wave guide means extending longitudinally of said strand, in which method the wave guide means is positioned against an elongate carrier and is secured thereto by adhesive means to form the strand.

The adhesive means may comprise bonding agent alone, or adhesive tape running longitudinally of the elongate carrier, or both bonding agent and adhesive tape, the tape running longitudinally of the elongate carrier. Preferably, the carrier is formed with longitudinally extending groove means into which the wave guide means is introduced for positioning agains the carrier. Barbs or serrations can be formed at intervals along longitudinal edges of the strand by a stamping process.

The adhesive means may be a bonding agent alone or an adhesive tape running longitudinally of the elongate carrier. Preferably, however, both such adhesive means are used. The bonding agent may be a one-part of a two-part resin.

It is desirable for the elongate carrier to be formed with longitudinally extending groove means into which the wave guide means is introduced for positioning against the carrier. The carrier can be provided along its longitudinal edges with barbs or serrations.

For a better understanding of the invention and to show show the same may be carried into effect, reference will now be made, by way of example, to the accompanying drawings, in which.

Figure 1:
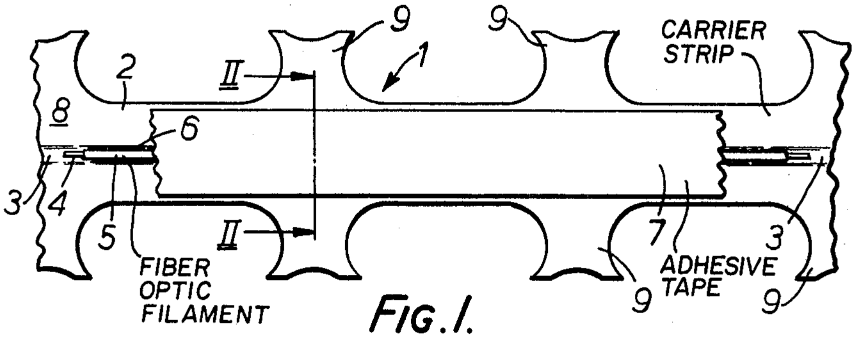
FIG. 1 is a plan view of a barbed strip.
Figure 2:
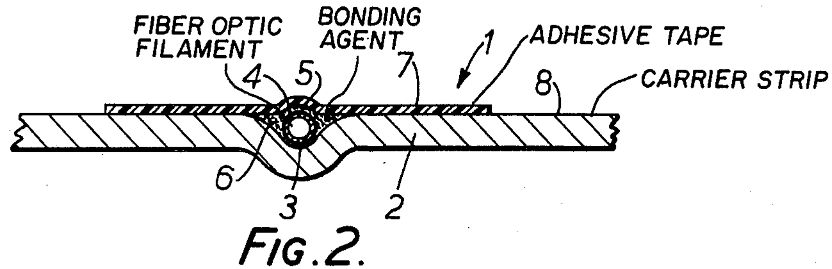
FIG. 2 is a part-sectional view on an enlarged scale taken along the line II—II of FIG. 1.

Referring to the FIGS. 1 and 2 a strip 1 of bendable material for use in a security system comprises a carrier strip 2, which can be made of steel but which may be a galvanised strip painted with a protective plastics-based paint, formed with a longitudinal groove 3 running along the centre of one (8) of its two principal faces. Located in this groove is a single fibre-optic filament 4, of ordinary commercial quality, with a sheathing 5 of plastics material which asists in protecting the filament. The sheathed fibre-optic filament is held in the groove by means of a suitable bonding agent 6, which may be a two-part flexible resin, and a strip of adhesive tape 7 is applied to the principal face 8 of the strip 1 so as to cover the housing agent in the groove 3 and also the adjacent surface areas of the principal face 8.

The strip is formed with barbs or serrations 9 at spaced intervals along its two longitudinal edges, although the provision of the barbs is not essential.

In accordance with a preferred method of manufacturing the barbed strip 1, the following manufacturing steps are carried out:

1. Edge portions of a length of carrier strip having straight longitudinal edges are punched away from both edges so as to provide the barbs or serrations 9.

2. The central groove 3 is formed in the steel strip 2 for example by passing the strip between a pair of male and female rollers. The steps 1 and 2 can be reversed, if desired.

3. Initiator chemical is smeared into the groove 3 and simultaneously resin, such as epoxy resin, is applied to the fibre-optic filament which is held ready to be introduced into the groove 3 so as to enrobe it. As an alternative to such two-part bonding agents, a single part bonding agent may be used, in which case this bonding agent is applied to the groove and/or the fibre-optic filament.

4. Introduction of the filament into the groove can now be effected. The bonding agent then becomes cured to secure the filament in position.

The manufacturing steps can be effected in a continuous manufacturing process in which the strip is unwound from a reel and passed successively through a punching station, preferably using rotary punches, a rolling station to form the longitudinal groove (the order of these two stations can be reversed) and a fibre-optic filament introducing station, and is then re-wound at a re-reeling station. The one or two-part bonding agent is applied at a suitable place or places. To prevent successive turns on the take-up reel from becoming bonded together by the cured bonding agent, it is necessary to take an appropriate step, such as applying the adhesive tape 7 to the principal face 8 so as to cover the bonding agent in the groove and overlie the adjacent surface areas of the principal face 8. This enables the finished strip to be wound onto a reel even before the bonding agent has become fully cured. Alternatively, the bonding agent can be cured at a stoving station between the fibre-optic filament introducing station and re-reeling station.

Figure 3:
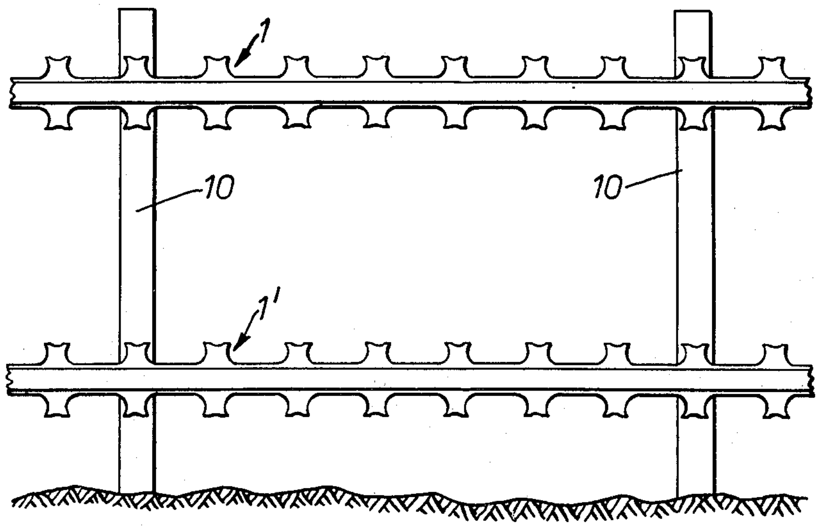
FIG. 3 illustrates one preferred way of using the barbed strip in a security fence.

The barbed strip is intended to be used in a corresponding manner to the strip disclosed in the aforementioned U.S. patent application as described with particular reference to FIGS. 2 and 3 of that application, and reference is accordingly directed to that application. In a development of the use there disclosed, it is possible to direct a pulsed light beam into one end of the fibre-optic filament with a view to enabling larger light intensities to be transmitted for a given transmitting power, thus enabling longer boundaries to be monitored by the optical detector and associated warning device. For greater security, the pulses may be coded and the detector arranged to operate the warning device if the preselected code is not detected.

As in the case of the strip disclosed in the aforementioned U.S. patent application, the barbs or serrations are not essential. Moreover, although desirable, the groove 3 can be dispensed with. Whether or not the groove is provided, the use of a bonding agent is not essential where adhesive tape is used since this tape alone can hold the fibre-optic filament in position.

In a preferred security system using more than one strip running along the boundary in question, at least one of the strips connecting adjacent posts incorporates a fibre-optic filament for example of the construction disclosed herein or in the aforementioned U.S. patent application its associated with its associated optical source and detector/warning system but at least one further strip being a "dummy" strip of identical external appearance to the fibre-optic strip but not incorporating any fibre-optic filament. Such an arrangement is shown in FIG. 3 to which reference is now directed. In this arrangement, a single fibre-optic strip and a single "dummy" strip are used, these strips being respectively denoted by references 1 and 1'. The fence posts are denoted by reference numeral 10. The advantage of such an arrangement is that since the cost of the "dummy" strip is obviously considerably less than that of the fibre-optic strip, the cost of installing the fence is correspondingly reduced. On the other hand, a similar measure of security is provided because an intruder, aware that a fibre-optic filament security system is being used, would not risk disturbing either strip in case that strip is the one containing the fibre-optic filament. In a modification, the "dummy" strip contains an electrical conductor such as a copper wire through which a current is passed for use in detecting if the wire is cut by an intruder. The cost of the fence would still be significantly less than if both strips were fibre-optic strips. Where more than one "dummy" strip is used, one or more may include an electric conductor whilst the remaining "dummy" strip(s) contain(s) no such conductor(s).

Lastly, it is mentioned that the strips may be twisted longitudinally so that barbs are provided extending in different directions. Alternatively, the barbs may be bent in alternate or random directions to achieve the same effect.

I claim:

1. A security system comprising a plurality of spaced apart supports disposed to extend along a given boundary, a plurality of strands running along the boundary and supported by said supports so as to form a physical barrier against intrusion, a first strand of said plurality of strands incorporating fibre-optic wave guide means, an energy source positioned to direct optical radiation along said guide means from one end, a detector positioned to detect radiation leaving said guide means from the other end and arranged to change the state thereof in response to a change in detected radiation outside a predetermined range, and at least one further strand of said plurality of strands comprising a dummy strand which is supported by said supports but is spaced from and otherwise unconnected to said first strand, said dummy strand being of identical appearance externally to said first strand but not including any fibre-optic wave guide means.

2. A security system according to claim 1 wherein said first strand is a composite strip comprising a carrier strip having a longitudinal groove therein, a fibre-optic filament disposed in said groove and held therein by a bonding agent, and a strip of adhesive tape applied to the carrier strip so as to overlie said groove and cover said bonding agent.

3. A method of making a composite strand incorporating a wave guide means extending longitudinally of said strand comprising the steps of: positioning said wave guide means against an elongated carrier, securing said wave guide means to said elongated carrier using a bonding agent, covering said bonding agent with an adhesive strip which is secured to said elongated carrier to prevent successive turns of said elongated carrier from becoming bonded together by said bonding agent when said bonded elongated carrier and wave guide means is later wound onto a take-up reel, and winding said bonded elongated carrier and wave guide means onto said take-up reel.

4. A method according to claim 3 comprising the further steps of forming the carrier with longitudinally extending groove means prior to the said positioning of the wave guide means, and introducing the wave guide means into the longitudinally extending groove means.

5. A method according to claim 3 comprising the additional step of forming barbs or serrations at intervals along longitudinal edges of the strand by a stamping process.

* * * * *